United States Patent
Montestruque et al.

(10) Patent No.: US 7,792,126 B1
(45) Date of Patent: Sep. 7, 2010

(54) DISTRIBUTED MONITORING AND CONTROL SYSTEM

(75) Inventors: Luis A. Montestruque, South Bend, IN (US); Michael D. Lemmon, Middlebury, IN (US); Jeffrey W. Talley, South Bend, IN (US)

(73) Assignees: EmNet, LLC, South Bend, IN (US); University of Notre Dame du Lac, Notre Dame, IN (US)

( * ) Notice: Subject to any disclaimer, the term of this patent is extended or adjusted under 35 U.S.C. 154(b) by 872 days.

(21) Appl. No.: 11/437,384

(22) Filed: May 19, 2006

Related U.S. Application Data

(60) Provisional application No. 60/682,384, filed on May 19, 2005.

(51) Int. Cl.
*H04L 12/00* (2006.01)
*E02B 13/00* (2006.01)

(52) U.S. Cl. .................. 370/400; 370/386; 405/36; 405/52

(58) Field of Classification Search .......... 370/315, 370/320, 347, 386, 389, 400; 137/1, 78.1, 137/312, 565.33; 340/3.1, 426.13, 426.16, 340/426.28, 521, 531, 539.1, 540, 870.01, 340/870.03, 870.07, 870.08, 870.16, 870.17; 405/36, 39, 52, 92, 129.57, 129.85; 700/3, 700/12, 103, 108

See application file for complete search history.

(56) References Cited

U.S. PATENT DOCUMENTS

| | | | |
|---|---|---|---|
| 3,638,490 A | 2/1972 | Brettner | |
| 4,026,151 A | 5/1977 | Fitzgerald | |
| 4,058,011 A | 11/1977 | Martig, Jr. | |
| 4,070,563 A | 1/1978 | Petroff | |
| 4,116,061 A | 9/1978 | Petroff | |
| 4,150,683 A | 4/1979 | Simon | |
| 4,188,968 A | 2/1980 | Trobaugh et al. | |
| 4,200,911 A | 4/1980 | Matsumoto | |
| 4,211,111 A | 7/1980 | Petroff | |
| 4,221,127 A | 9/1980 | McClure | |
| 4,258,747 A | 3/1981 | Trobaugh | |
| 4,268,383 A | 5/1981 | Trobaugh | |
| 4,295,197 A | 10/1981 | Petroff | |
| 4,344,329 A | 8/1982 | Petroff | |
| 4,386,409 A | 5/1983 | Petroff | |
| 4,407,158 A | 10/1983 | Petroff | |
| 4,571,997 A | 2/1986 | Kepple et al. | |
| 4,630,474 A | 12/1986 | Petroff | |
| 4,892,440 A | 1/1990 | Regan | |
| 4,987,913 A * | 1/1991 | Kodate et al. | 137/1 |
| 4,997,312 A | 3/1991 | Regan | |
| 5,020,374 A | 6/1991 | Petroff et al. | |
| 5,161,911 A | 11/1992 | Regan | |

(Continued)

*Primary Examiner*—Jayanti K Patel
*Assistant Examiner*—Matthew Campbell
(74) *Attorney, Agent, or Firm*—McDermott Will & Emery LLP

(57) ABSTRACT

A distributed monitoring and control system includes a plurality of nodes forming a redundant communication network. Each of the nodes includes a processor, a memory and a transceiver. At least one of the nodes includes a sensor for acquiring information. At least one of the nodes includes an actuator. At least one of the processors is programmed with a control algorithm to receive information acquired from the sensors, calculate a control command and communicate the control command to the actuators for execution.

19 Claims, 9 Drawing Sheets

U.S. PATENT DOCUMENTS

| | | | |
|---|---|---|---|
| 5,198,989 A | 3/1993 | Petroff | |
| 5,321,601 A | 6/1994 | Riedel et al. | |
| 5,342,144 A * | 8/1994 | McCarthy | 405/39 |
| 5,365,423 A * | 11/1994 | Chand | 700/12 |
| 5,371,859 A * | 12/1994 | Lennartsson | 710/114 |
| 5,423,226 A | 6/1995 | Hunter et al. | |
| 5,448,476 A | 9/1995 | Kurokawa et al. | |
| 5,506,791 A | 4/1996 | Hungerford et al. | |
| 5,608,171 A * | 3/1997 | Hunter et al. | 73/861.63 |
| 5,633,809 A | 5/1997 | Wissenbach et al. | |
| 5,684,250 A | 11/1997 | Marsh et al. | |
| 5,834,659 A | 11/1998 | Ortiz et al. | |
| 5,835,836 A | 11/1998 | Hirao | |
| 5,870,692 A | 2/1999 | Millo | |
| 5,874,903 A * | 2/1999 | Shuey et al. | 340/870.02 |
| 5,886,267 A | 3/1999 | Ortiz | |
| 5,905,208 A | 5/1999 | Ortiz et al. | |
| 5,942,698 A | 8/1999 | Stevens | |
| 5,978,364 A * | 11/1999 | Melnik | 370/320 |
| 5,979,493 A | 11/1999 | Simpkins, Jr. | |
| 6,009,762 A | 1/2000 | Ockleston | |
| 6,021,664 A | 2/2000 | Granato et al. | |
| 6,082,925 A | 7/2000 | Raasch | |
| 6,216,543 B1 | 4/2001 | Colin | |
| 6,317,051 B1 | 11/2001 | Cohen | |
| 6,318,395 B1 | 11/2001 | Anderson et al. | |
| 6,406,216 B1 | 6/2002 | Raasch | |
| 6,437,692 B1 * | 8/2002 | Petite et al. | 340/540 |
| 6,474,153 B1 | 11/2002 | Yamanaka et al. | |
| 6,498,968 B1 * | 12/2002 | Bush | 701/3 |
| 6,558,077 B1 * | 5/2003 | Colson | 405/36 |
| 6,565,284 B2 | 5/2003 | Gearhart | |
| 6,618,648 B1 | 9/2003 | Shirota et al. | |
| 6,638,424 B2 | 10/2003 | Stever et al. | |
| 6,696,961 B2 | 2/2004 | Uhler | |
| 6,701,261 B2 | 3/2004 | Schutzbach | |
| 6,757,623 B2 | 6/2004 | Schutzbach et al. | |
| 6,807,494 B2 | 10/2004 | Schutzbach et al. | |
| 6,823,729 B2 | 11/2004 | Brombach | |
| 6,832,166 B2 | 12/2004 | Schutzbach | |
| 6,862,498 B2 | 3/2005 | Davis et al. | |
| 6,914,893 B2 | 7/2005 | Petite | |
| 2002/0035497 A1 | 3/2002 | Mazereeuw et al. | |
| 2002/0094799 A1 | 7/2002 | Elliott et al. | |
| 2002/0170350 A1 | 11/2002 | Schutzbach | |
| 2003/0236639 A1 | 12/2003 | Curry | |
| 2004/0239523 A1 | 12/2004 | Paoli et al. | |
| 2005/0005093 A1 | 1/2005 | Bartels et al. | |
| 2005/0071139 A1 | 3/2005 | Patwarahan et al. | |
| 2005/0072465 A1 | 4/2005 | Preul | |
| 2005/0072469 A1 | 4/2005 | Preul | |
| 2006/0164771 A1 * | 7/2006 | Heidepriem | 361/91.2 |

* cited by examiner

US 7,792,126 B1

DISTRIBUTED MONITORING AND CONTROL SYSTEM

CROSS REFERENCE TO RELATED APPLICATIONS

The present application claims the benefit of U.S. Provisional Application No. 60/682,384, filed May 19, 2005.

TECHNICAL FIELD

The present subject-matter generally relates to a distributed monitoring and control system. More specifically, the present subject-matter relates to a system using distributed monitoring and control of combined sewer systems to reduce combined sewer overflow conditions.

BACKGROUND OF THE INVENTION

In many cities wastewater and rainwater are collected together in a combined sewer system. These combined sewer systems create a potential for a combined sewer overflow (CSO). A CSO occurs when a wastewater treatment facility experiences excessive inflow due to wet weather conditions resulting in an overflow or discharge of contaminated water. In some cases, the overflow water backs up into homes or businesses. In order to prevent raw sewage backup into homes and businesses, waste water treatment facilities often divert the overflow into an open stream or river. Accordingly, a CSO event often results in the contamination or rivers, lakes and ocean shores and presents numerous environmental health-related dangers.

The problems associated with CSO events have been addressed by replacing combined sewers with dual collection and disposal systems, providing off-line storage facilities, such as providing underground tunnels, or expanding the capacity of the overloaded waste water treatment facility. However, these solutions require intensive and expensive construction, which can be disruptive to cities and their population. Moreover, separating wastewater and rainwater collection does not completely solve the environmental problems since untreated storm water often carries contaminants washed away from streets.

An alternative option is to use in-line storage using real-time monitoring, which monitors the flow and composition of the fluid in the sewer. When a CSO event is predicted the system reacts by using the pipes as a temporary storage. A real-time control system calculates the unused volume in each of the main arterial pipes and sends command signals to gates, inflatable dams or valves to regulate the flow. Existing in-line storage solutions suffer because the large amount of information required to effectively control the system must be transmitted to a central processor for processing and the communication, monitoring and control require great expense and are prone to failure.

SUMMARY

The present subject-matter provides a distributed monitoring and control system. The distributed monitoring and control system may be implemented to reduce the occurrence of combined sewer overflow. The distributed monitoring and control system includes a plurality of nodes, each of which includes a processor, a memory and a transceiver. The system includes a plurality of nodes, including nodes having different functions, such as rNodes, iNodes, aNodes and gNodes. Each of the nodes provides interconnectivity between nodes that cannot communicate directly. The iNodes further include sensors to monitor the flow in the sewer and a sensor interface. The aNodes further include actuators for the control systems. The gNodes may include the functionality of the other nodes and further include a connection to another network outside of the wireless network of nodes. The nodes may use a control algorithm that allows the system to function without a central computing element, thereby increasing the robustness of the system.

An advantage of the distributed monitoring and control system is the reduction of overflow conditions in combined sewer systems.

Another advantage of the distributed monitoring and control system is the ability to use of a distributed control algorithm and an ad-hoc wireless communication system to manipulate flow control structures.

A further advantage of the distributed monitoring and control system is the ability for wireless and battery operation to allow fast and easy installation.

Yet another advantage of the distributed monitoring and control system is the decentralization and redundancy provides robustness to allow the system to function even with some malfunctioning parts.

Still another advantage of the distributed monitoring and control system is the distributed nodes and the lack of a centralized control system provides decreased vulnerability to individual sensor failure and central computer failure.

Another advantage of the distributed monitoring and control system is the distribution of the sensors enables more precise and more accurate measurements even when individual measurements are not as accurate.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

DETAILED DESCRIPTION

Figure 1:
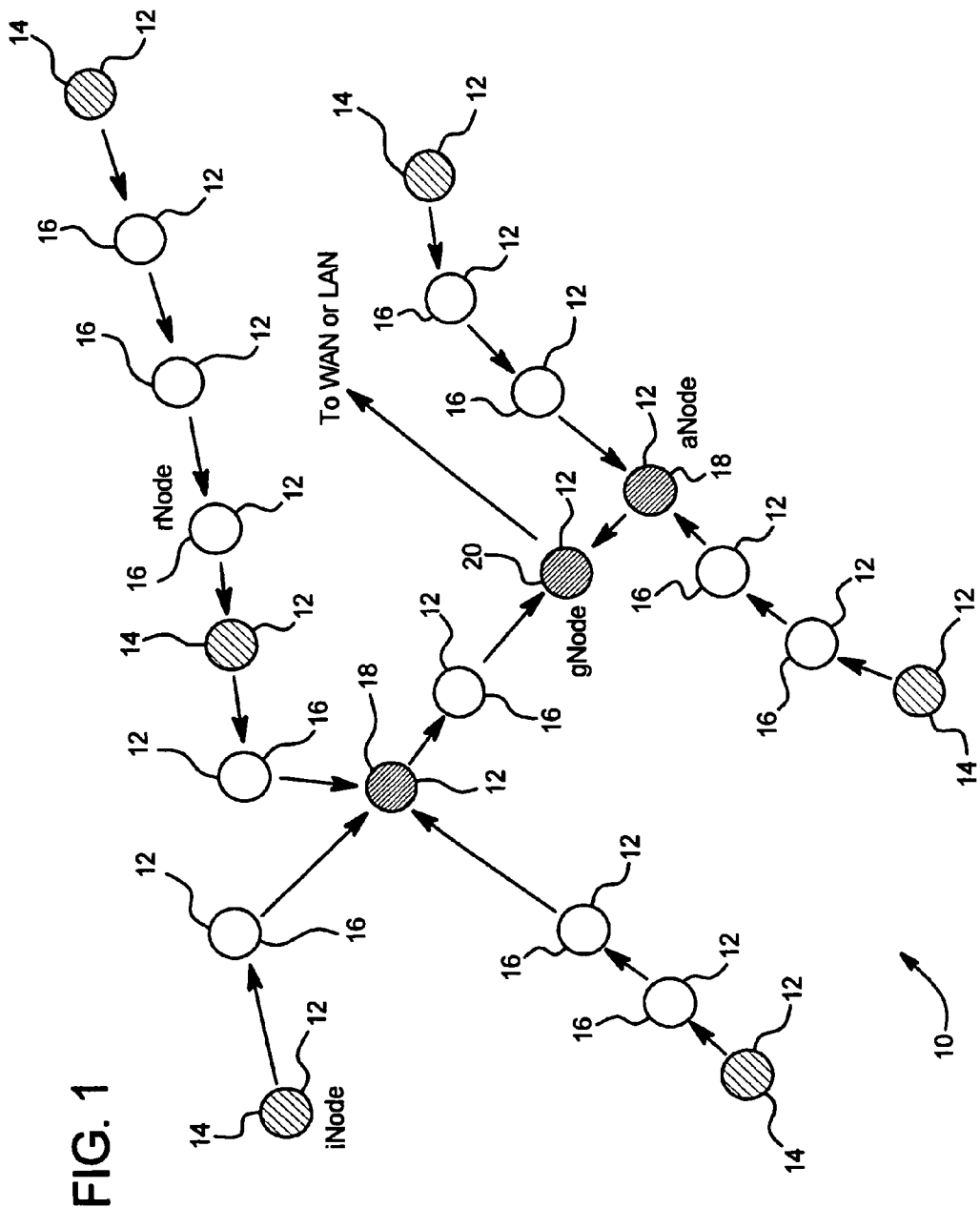
FIG. 1 is a schematic of a distributed monitoring and control system.

FIG. 1 schematically illustrates a distributed monitoring and control system 10 for monitoring and controlling flow in a combined sewer system. As shown in FIG. 1, the distributed monitoring and control system 10 includes a plurality of intercommunicating nodes 12. In the distributed monitoring and control system 10 shown in FIG. 1, there are sensor nodes (iNodes) 14, routing nodes (rNodes) 16, actuator nodes (aNodes) 18 and gateway nodes (gNodes) 20. In the example shown in FIG. 1, the communication between the nodes 12 is achieved using a wireless transceiver in each of the nodes 12, as described further below. Although the preferred embodiment of the distributed monitoring and control system 10 described herein is a wireless system, it is contemplated that wired or hybrid (wired and wireless combination) communication may be utilized to accomplish the distributed monitoring and control system 10.

Figure 2:
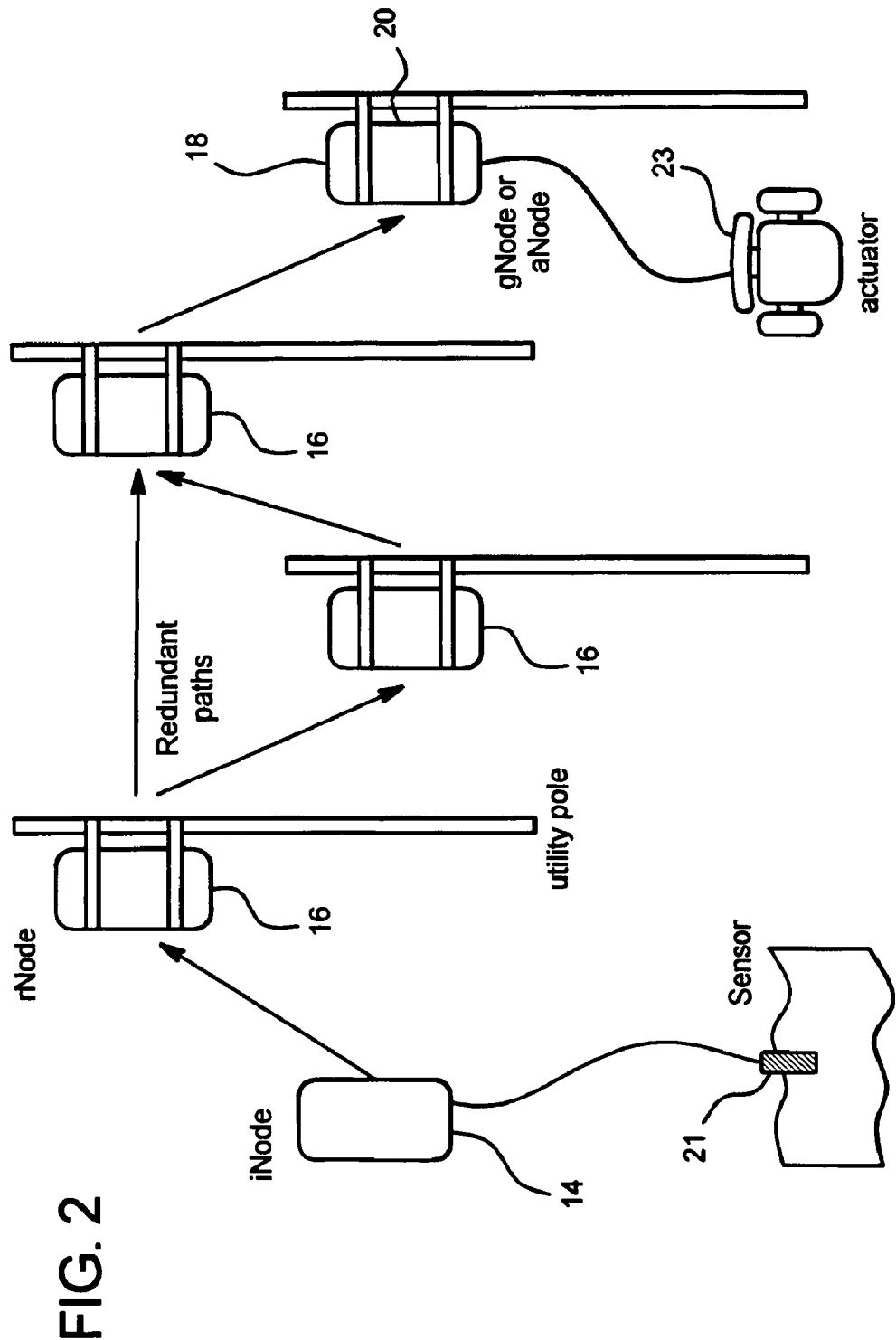
FIG. 2 is a schematic of a data transmission path in the distributed monitoring and control system of FIG. 1.

As shown in FIG. 2, the iNode 14 collects information from a sensor 21. The information is then sent through one or more rNodes 16 to an aNode 18 for controlling flow though the sewer system or to a gNode 20 for connecting to another network. However, it is contemplated in other embodiments of the distributed monitoring and control system 10 any of the nodes 12 may perform the function of an iNode 14, an rNode 16, an aNode 18, a gNode 20, or any combination thereof. For example, all nodes 12 in a given distributed monitoring and control system 10 may function as rNodes 16 and certain nodes may additionally perform the function of the iNodes 14, the aNodes 18 and the gNodes 20. Although it is understood that each node 12 in the distributed monitoring and control system 10 may perform any combination of the functions of any of the different types of nodes 12, each of the types of nodes 12 will be described separately below.

The rNodes 16 include a microprocessor, a memory and a transceiver, such as, for example, a radio transceiver. The main purpose of the rNodes 16 is to provide interconnectivity between nodes 12 that cannot communicate directly. For example, an rNode 16, or a series of rNodes 16, may function to connect an iNode 14 and an aNode 18 that are geographically separated by a distance greater than their transceivers' range.

The iNodes 14 include the same elements as the rNodes 16 and additionally include a sensor interface. The sensor interface allows a variety of sensors to be attached to the iNode 14. In the embodiment shown in FIGS. 1 and 2, the sensor interface controls the power delivered to each sensor and allows the iNode's processor to acquire information gathered by the sensor while reducing power consumption when the sensors are not taking measurements. In the embodiment of the distributed monitoring and control system 10 shown in FIGS. 1 and 2, the iNodes 14 main purpose is to measure parameters that indicate the hydraulic state of the monitored structure or the pollution content of the wastewater therein. For example, an iNode 14 may acquire information gathered by an e-coli sensor, a pH sensor, a pressure sensor, a temperature sensor, a conductivity sensor, a dissolved oxygen sensor, etc.

The aNodes 18 include the same elements as the rNodes 16 and additionally include an actuator interface. The actuator interface allows different types of actuators 23 (see FIG. 2) to be attached to the aNode 18. Examples of actuators to be used in the distributed monitoring and control system 10 shown in FIGS. 1 and 2 include, without limitation, electric valves, gates, weirs, pumps, lift stations and other general flow controlling devices.

The gNodes 20 include the same elements as the rNodes 16 and additionally include a networking interface. The networking interface allows the gNodes 20 to connect the wireless network formed by the nodes 12 to another network, such as, for example, a wide area network, a local area network or a cellular data network. Connecting the wireless network of nodes 12 to another network allows an operator or observer to interact with the network or the network data, as well as additional nodes 12 outside of the wireless network. It is contemplated that the gNodes 20 are not essential for the operation of the distributed monitoring and control system 10, particularly if there is no need to share the information with other networks.

Figure 3:
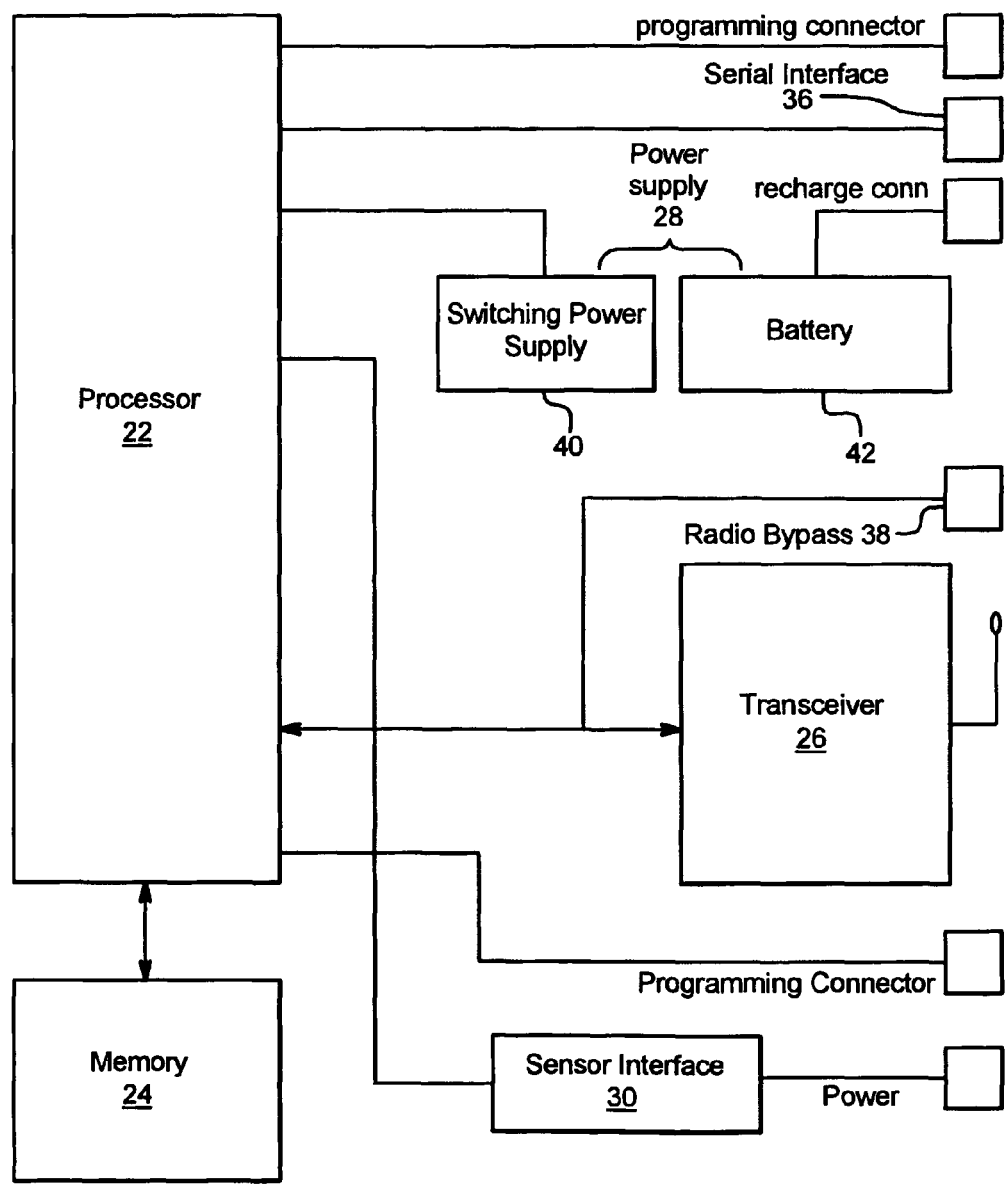
FIG. 3 is a schematic of node for the distributed monitoring and control system of FIG. 1.

FIG. 3 schematically illustrates an embodiment of one of the iNodes 14 of the distributed monitoring and control system 10 shown in FIGS. 1 and 2. As shown in FIG. 3, the iNode 14 includes a processor 22, a memory 24, a transceiver 26, a power supply 28 and a sensor interface 30. In the embodiment shown in FIG. 3, the processor 22 is an ATMEGA128 processor operating at 8 MHz. However, it is understood that any processor or plurality of processors may be incorporated into the iNode 14 as the processor 22.

In the embodiment shown in FIG. 3, the processor 22 runs a software application for acquiring data from the sensor through the sensor interface 30, processes the data and controls the power management and high-level networking layers. As shown in FIG. 3, the processor 22 is coupled to a serial interface 36. The serial interface may be, for example a keyboard/display interface or a serial connection to be attached to a serial dumb terminal for human interaction. Other uses for the serial connection include debugging and interconnecting with other serial devices. The serial interface 36 allows a high degree of node programming flexibility and allows for easy debugging, setting and reading program parameters and other general node interface.

In the embodiment shown in FIG. 3, the processor 22 is also responsible for the lower levels of networking, the radio management and the memory management. Alternatively, the tasks may be divided in any manner between any number of processors.

The memory 24 in the embodiment of the iNode 14 shown in FIG. 3. is an AT45DB161B two megabyte EEPROM. However, it is contemplated other memory may be used in the nodes 12. The memory 24 allows large quantities of data acquired from the sensor to be stored allowing the iNode 14 to record data measured by sensors when communication with other nodes 12 is not available, thereby preventing the loss of information. When communication with other nodes 12 is restored, the stored data can then be streamed or extracted from the memory 24. The memory 24 may also store main processor program images when network reprogramming is necessary.

The transceiver 26 in the embodiment of the iNode 14 shown in FIG. 3 is a MaxStream radio transceiver 26 operating at 900 MHz or 2.4 GHz depending upon the application. The radio transceiver 26 allows the use of direct-sequence spread spectrum communication to effectively reduce the possibility of interference. Reliable and robust communication schemes can be implemented to efficiently manage communication between nodes 12.

The processor 22 controls the transceiver power control. The transceiver power control drastically reduces the power consumption of the transceiver 26 when no events require the transmission of information. Further, the use of wireless multihop connections allows the use of small transceivers 26 with limited transmission range since it is not necessary to transmit to a distant central location, which allows the use of batteries or solar power to power the nodes 12. In addition, as shown in FIG. 3, a radio bypass 38, such as, for example, a UART compatible bypass, allows the iNode 14 to communicate using conventional wired networks when necessary.

The power supply 28 in the embodiment of the iNode 14 shown in FIG. 3 includes a switching power supply 40 and a 6 Volt rechargeable nickel metal hydride battery 42 that allow numerous discharge-charge cycles while retaining its capacity. However, it is contemplated that other power supplies 28, switching or non-switching, battery powered or non-battery powered and rechargeable or non-rechargeable, may be implemented in the iNode 14. In the embodiment shown in FIG. 3, the switching power supply 40 regulates the input battery voltage to three different voltages used for the circuitry, namely 3.3 Volts, 5 Volts and 12 Volts. The power supply 28 enables operation with battery voltages as low as 4 Volts. The processor 22 monitors the battery condition to alert the system and safely shut down when loss of power occurs. It is contemplated that a battery life of at least twelve months of continuous operation is preferable. Additionally, solar panels can be attached to the recharge battery to allow uninterrupted operation.

The nodes 12 and other devices connected to the nodes 12, such as the sensors 21 and actuators 23, may operate using limited power sources, such as, for example, batteries or solar power, in order to allow wireless installation. Although wireless installation can reduce installation costs, it may require aggressive power management. Accordingly, the processor 22 may be programmed with power management software to control power delivery to components such as, for example, sensors 21, actuators 23, transceivers 26, memory 24 and processor 22. For example, in low power state, the power management software disconnects the power to the sensors 21, actuators 23 and transceivers 26 and reduces the power provided to the memory 24 and processors 22, when advantageous. In particular, the power management software only delivers power to the sensors 21 when needed via the sensor interface 30, which contains MOSFET transistors that connect the power supply 28 to the sensors 21 for short periods of time.

Although FIG. 3 specifically illustrates an iNode 14, it is contemplated that the rNodes 16 may include the same components, excluding the sensor interface 30. Similarly, the aNodes 18 and gNodes 20 may include the same components excluding the sensor interface 30, but additionally including an actuator interface in the aNodes 18 and a network interface in the gNodes 20. The processor 22 of each of the nodes 12 may be programmed to correspond to the components contained therein.

For example, the aNodes 18 may include an actuator interface capable of generating a 12 Volt pulse modulated signal for controlling a DC electric motor and two current outputs. The current outputs can be used to send signals to an actuator 23 using a standard 4-20 mA input interface. Since the aNodes 18 are typically connected to power consuming actuators 23 that require external electrical connection, power management is not as critical in these devices.

Also as an example, the gNodes 20 may be formed by connecting an iNode 14, an rNode 16 or an aNode 18 to a larger processor board. For example, the gNodes 20 may be connected to a Technologic Systems TS5600 that features a 133 MHz AMD 586 embedded microprocessor running the Linux operating system. The processor board also includes a PC card slot that can allocate a 802.11 or WiFi interface card or a cellular modem card. The processor board further includes an Ethernet connector. The processor board communicates to the gNode 20 using the serial interface 36.

As described above with respect to the iNode 14 shown in FIG. 3, the processor 22 of each of the nodes 12 is programmed to enable communication between the nodes 12 in a robust manner. Robustness is expressed as the ability to communicate even in the presence of some non-functional nodes 12. FIGS. 4A-4E illustrate the robustness of the distributed monitoring and control system 10. In the distributed monitoring and control system 10 shown in FIGS. 4A-4E, robustness is achieved by using redundant paths, or in other words, the placement of nodes 12 geographically such that each node 12 can communicate with more nodes 12 than necessary to obtain a fully connected and communicating network of nodes 12.

To implement the distributed monitoring and control system 10 shown in FIGS. 4A-4E, the nodes 12 employ two types of communication algorithms, broadcasting and routing, each of which is programmed into the processor 22. The broadcasting algorithm allows each node 12 to send a message to every other node 12. The routing algorithm allows each node 12 to send a message to a unique node 12. The processor 22 is programmed with an advanced large-scale routing algorithm to ensure network connectivity despite potential failure of one or more nodes 12.

For example, in the embodiment of the distributed monitoring and control system 10 described herein with respect to monitoring and controlling sewer systems, it is contemplated that the expected internode connectivity will be low, typically in the range of 60% of data packet throughput between neighboring nodes 12. Assuming an in-line configuration, in which only neighboring nodes 12 can communicate with each other, the data packet throughput between one end of the line to the other using conventional communication algorithms would be 0.6% or 0.6%. Accordingly, a robust routing algorithm is required to increase throughput in these types of low connectivity networks.

The distributed monitoring and control system 10 shown in FIGS. 1-4E includes a broadcasting algorithm that allows each node 12 to communicate with each of the other nodes 12 in the wireless network, enabling network synchronization and node polling. Under this broadcasting algorithm, when a node 12 send out a broadcast message, every node 12 that receives the message initiates the broadcasting algorithm. Each node 12 rebroadcasts the message to increase the probability of communication success. In one embodiment of the broadcast algorithm each message is repeated three times. The algorithm may dictate that each node 12 wait a predetermined period of time before trying to rebroadcast the message in order to reduce the probability of message collision with other nodes that are transmitting the originally broadcast message. Under this broadcast algorithm, the communication success for an in-line system is $(1-(0.4^3))^{10}$ or 53%. By increasing the number of retransmissions of each packet, packet throughput can be increased to near 100% at the expense of longer transmission lines.

Each data packet contains data to aid the broadcasting process. For example, a hop counter may be used to limit the number of nodes 12 through which a message can travel from its original source. Each time a node 12 transmits a broadcast message data packet, the hop count increases. When the hop counter reaches a predefined value, the data packet gets discarded without being retransmitted. An identification number may also be appended to the data packet to ensure each message is propagated outward from its origin. The identification number is generated at the origin node by combining the hop counter with the network address of the node 12. If a node 12 receives a data packet with an identification number that matches the identification number of a previously received message, the data packet gets discarded without being retransmitted. Moreover, timing information may be appended to a message to allow each node 12 to calculate the time it took a message received to arrive since being transmitted by the origin node 12.

The routing algorithm allows any node 12 in the network to transmit a message to specific nodes 12 within the network designated as data sinks. This feature is particularly useful, for example, for the iNodes 14 that need to send information to specific aNodes 18 or gNodes 20. Each node 12 contains a table of the data sinks in the network. Associated with each entry is a number called the gradient. The gradient number is smaller when the node 12 is closer to the data sink. Each data sink itself has a gradient number of 0. When a node 12 is required to transmit a message to a data sink, the node 12 broadcasts the message with its own gradient number and the data sink address appended to the data to be transmitted. If a node with lower gradient number receives the message, it broadcasts an acknowledgement packet, including its own gradient number, to the data sink. If the original message source does not receive an acknowledgement packet with a gradient lower than its own before a specified time it broadcasts again. The number of retries can be specified in the software and may, for example, have a default value of three. If a node 12 receives a packet with a gradient number equal or greater than the senders gradient, the packet may be discarded. Alternatively, additional routes may be established by allowing rebroadcasting when the gradient difference is within an established threshold. In either example, after a node 12 has sent an acknowledgement packet, it will rebroadcast the original message with its own gradient number and the process is repeated until the message arrives to its destination, specifically, the node with the matching data sink address. In this way the routing algorithm ensures that the message will approach the destination even if it must branch off in the process and take different routes. This type of routing protocol belongs to a class of stateless routing protocols that are particularly resilient to node failure because it allows the network to function without any node keeping track of information paths. This type of stateless routing protocol avoids the problems associated with gateway based routing protocols.

A message identification number similar to the one used for the broadcasting algorithm can be used to prevent the algorithm from using overlapping routes. Also, by enforcing a requirement that the gradient difference between the sender and the rebroadcasting node has to be bigger than a certain threshold, the number of potential routes can be reduced.

In order to establish the algorithms described above ad-hoc, a broadcasting algorithm is used by the data sink nodes 12 to setup routing (or gradient) tables in each node 12. By receiving the message broadcast by the data sink, each node 12 can establish its number of hops from the data sink. This information is used to generate an appropriate gradient number that is then stored in each node's routing algorithm table together with the data sink address.

Several additional tasks may be performed by the network, including, for example, network synchronization. Network synchronization allows the nodes 12 to undergo alternating cycles of deep sleep mode and active mode in a synchronized fashion. In this way, the nodes 12 may all be active and can perform control and communication activities while in the active mode and otherwise enter deep sleep modes for low power consumption.

Typically, the power consumption in active modes can be up to 2500 times the power consumed in sleep modes. Therefore, it is essential that the nodes 12 remain in sleep mode as long as possible. To achieve this, the nodes 12 enter and leave power cycles in a synchronized fashion. The time when all the nodes 12 are in active mode is referred to as the "active window." The active window can be a few seconds per cycle, for example, thirty seconds. During the active window all internodal and control algorithms must be executed. In one example, one node 12 in the network or subnetwork is in charge of synchronization for the entire network or subnetwork. Typically, this node 12 will be a gNode 20, but it can be any other node 12. This node 12 is referred to as the synchronization node 12.

The synchronization node 12 can send out a synchronization packet via the broadcasting algorithm previously described. The synchronization packet is sent during the active window. The synchronization packet may include, for example, the time when the request for a new synchronization was issued, the packet traveling time and the sleeping time. Each receiving node 12 will adjust the remaining active window time to match the one described in the packet by using the traveling time. Additionally, in the case of CSO control for example, an adaptive power cycle scheduling may be used to reduce power consumption when wet weather conditions are not forecasted by using a greater amount of time between active windows. Conversely, when wet weather conditions are forecasted, the sleeping time may be reduced, allowing critical information about the sewer system to be shared throughout the network on an accelerated schedule. Due to the natural drift of the internal clocks of the nodes 12, the synchronization process must be performed periodically, typically once a day. Regular synchronization of the internal clocks of the nodes 12 ensures tight synchronization and, therefore, well aligned active windows among all the nodes 12.

As described herein, the low power sleep mode may be executed by a software component within the node 12 that puts the radio transceiver 26 in low power mode, disables the memory 24, turns the power supply for the sensors 21 off, and stops all timers except for a single unique timer that is used to maintain the adaptive power scheduling cycle. The timer allowed to run by the low power mode software component and is setup to wake up the processor after a time specified by the adaptive power cycle scheduling protocol.

The robustness of the distributed monitoring and control system 10 can be further enhanced by organizing the nodes 12 into hierarchical subnetworks. For example, a subnetwork can be formed to include at least one gNode 20 which may communicate with other networks or subnetworks. By way of example, the distributed monitoring and control system 10 shown in FIGS. 4A-4E may be an independent network or a subnetwork within a larger network.

Figure 4A:
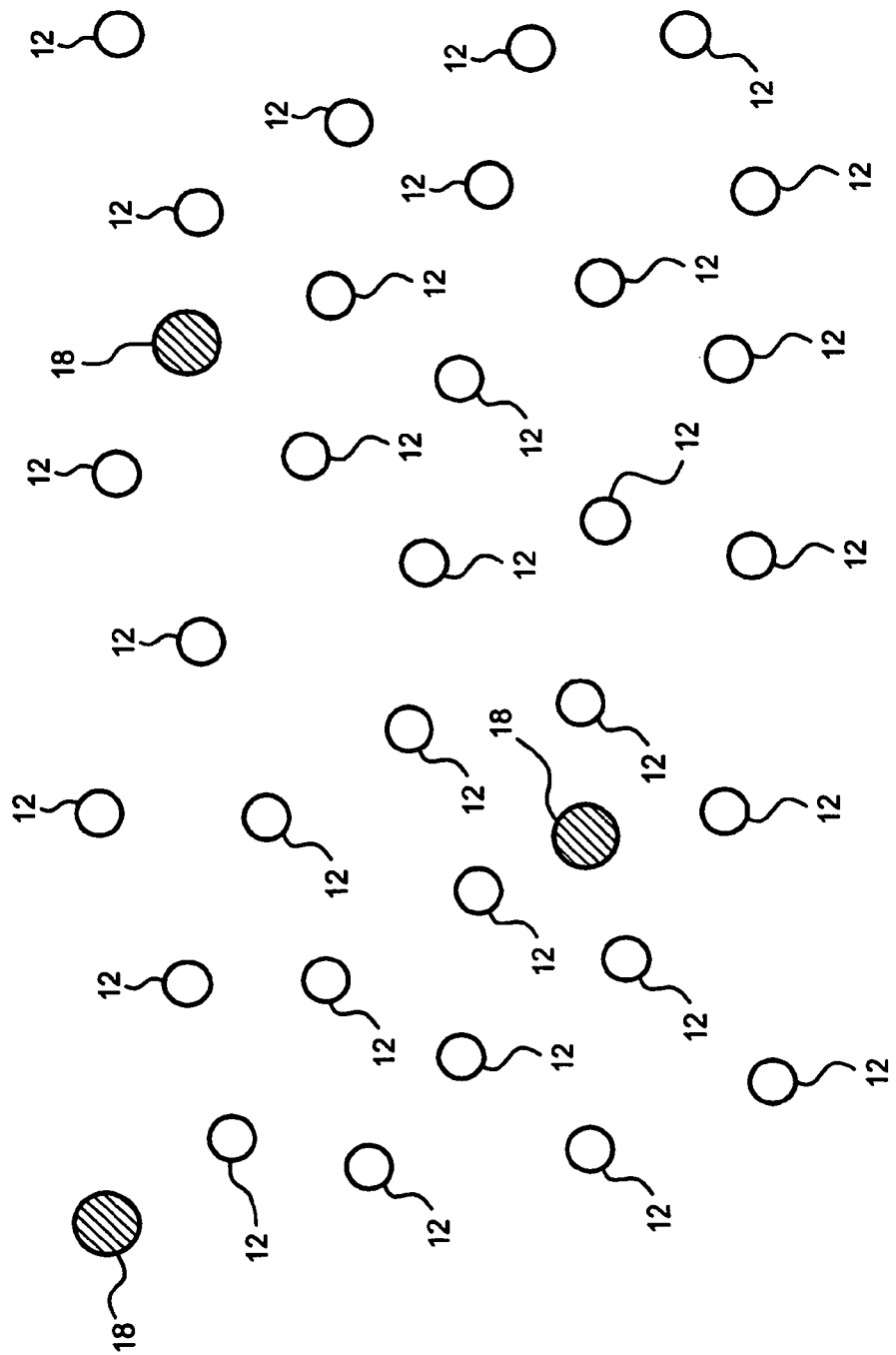
FIG. 4A is a schematic illustrating a network of nodes in a distributed monitoring and control system.
Figure 4B:
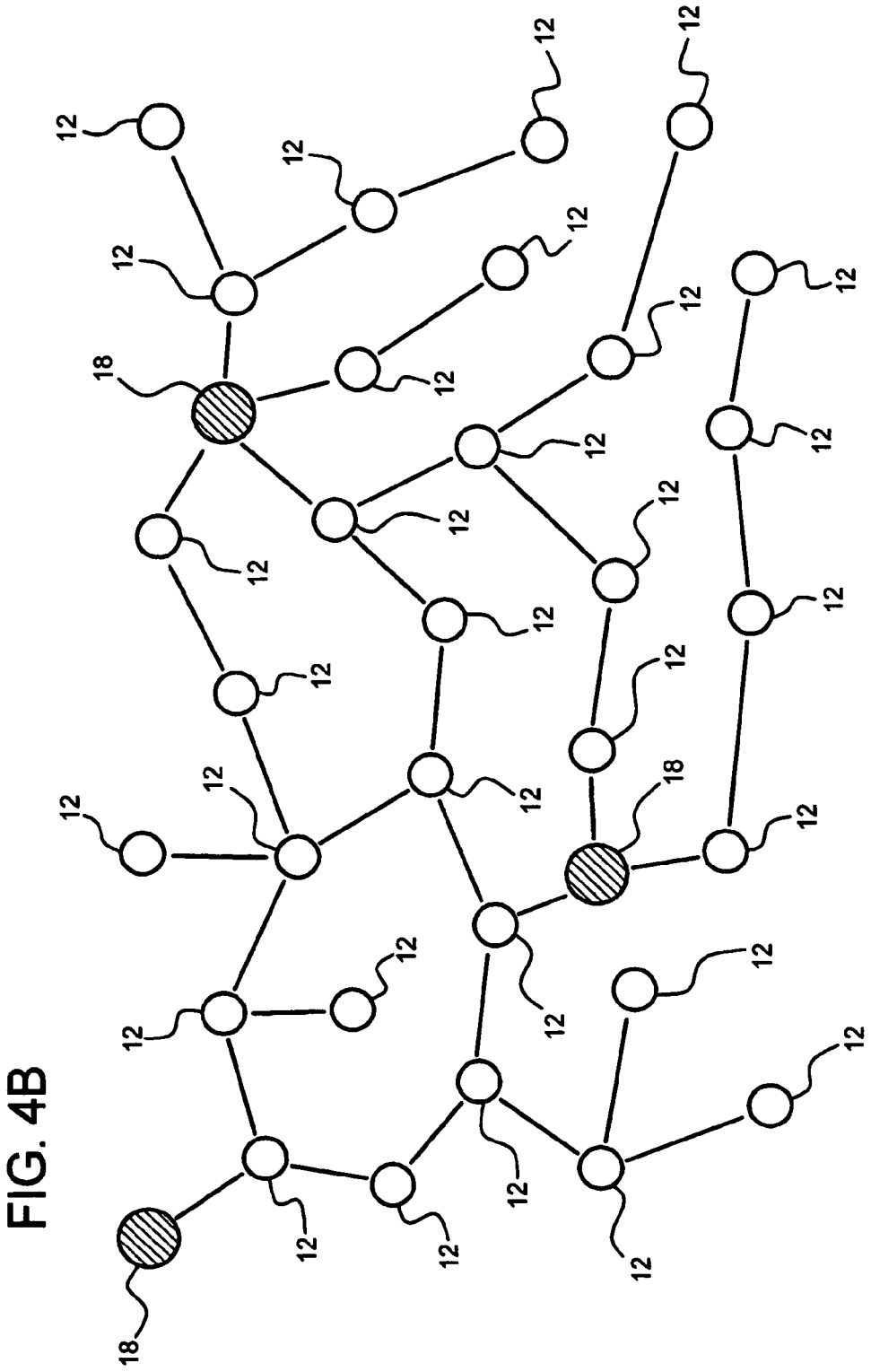
FIG. 4B is a schematic illustrating network connectivity between the nodes shown in FIG. 4A.
Figure 4C:
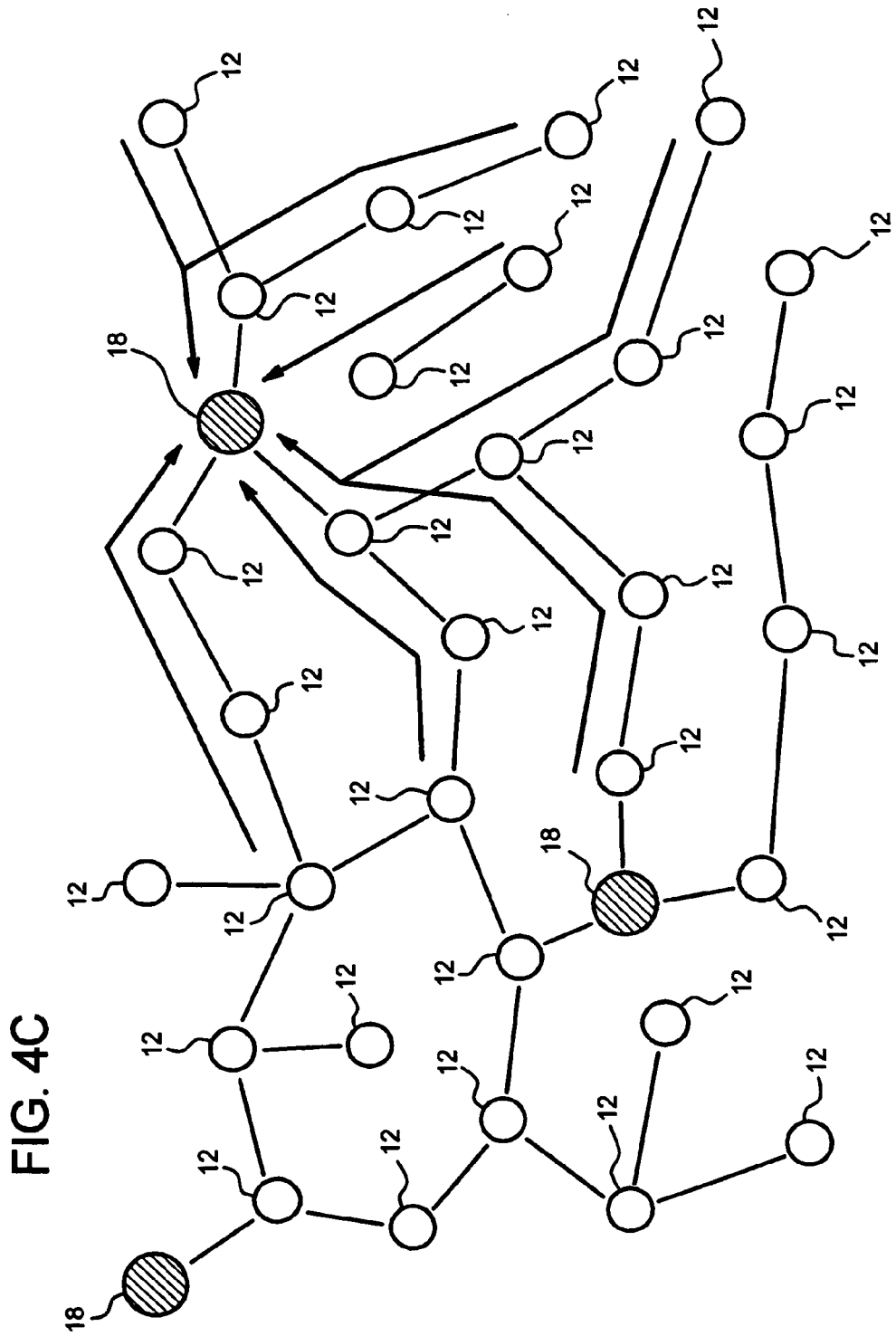
FIG. 4C is a schematic illustrating transmission of information within the network shown in FIG. 4B.
Figure 4D:
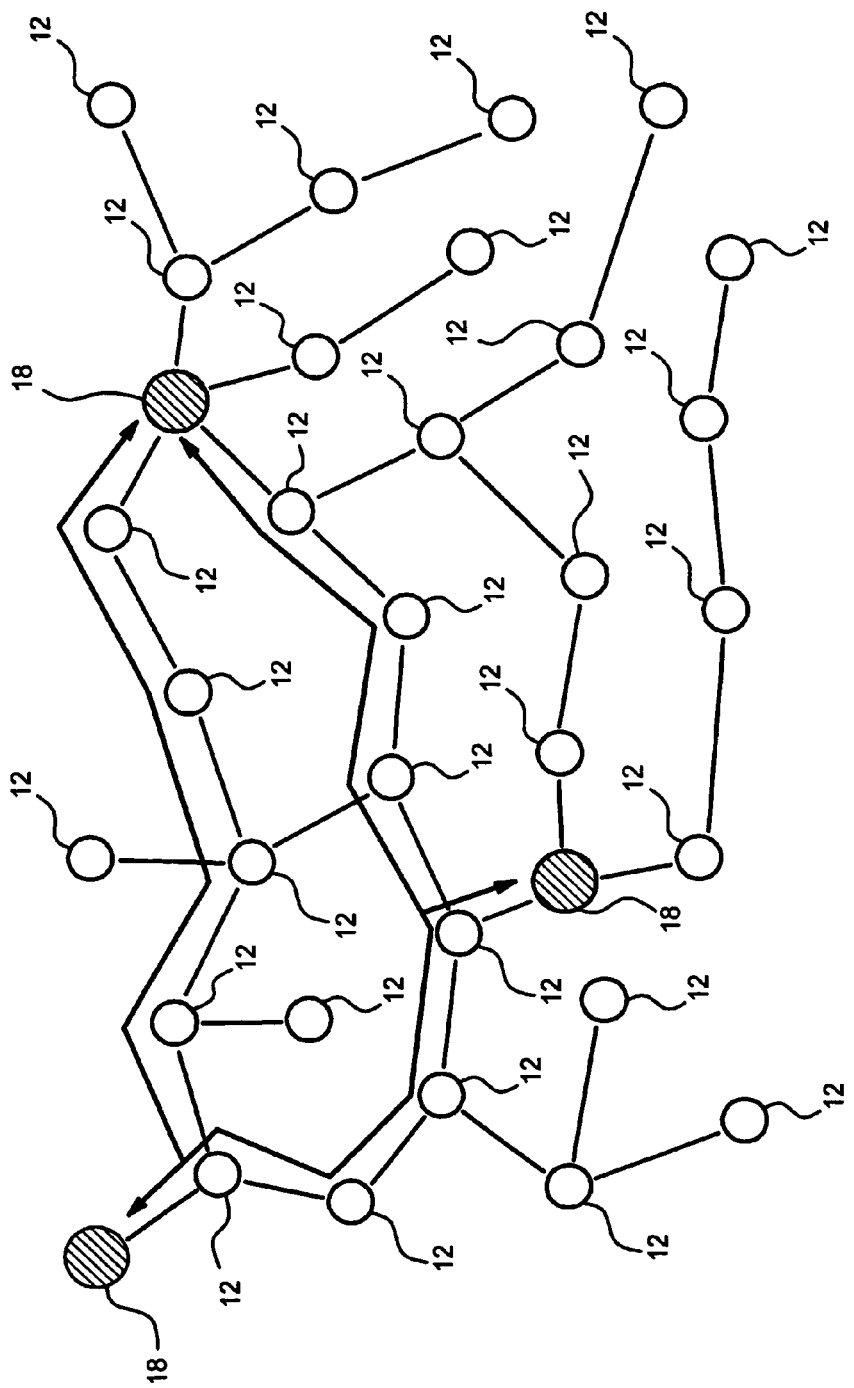
FIG. 4D is a schematic illustrating the transmission of control instructions within the network shown in FIG. 4C.

As shown in FIG. 4A, the distributed monitoring and control system 10 includes a network of nodes 12. The network in FIG. 4A includes iNodes 14, rNodes 16, and gNodes 20 represented as nodes 12 and three specifically designated aNodes 18. However, the examples discussed with respect to FIGS. 4A-4E, may be applicable to networks including any number of each o the various nodes 12. FIG. 4B illustrates one example of network connectivity between the nodes shown in FIG. 4A, such that each of the nodes 12 forms a part of the network. The aNodes 18 shown in FIG. 4A may request sensor information from iNodes 14. FIG. 4C illustrates the flow of sensor information through the network to the aNodes 18. FIG. 4D shows the aNodes 18 communicating with each other to make a decision based on the combined information.

Figure 4E:
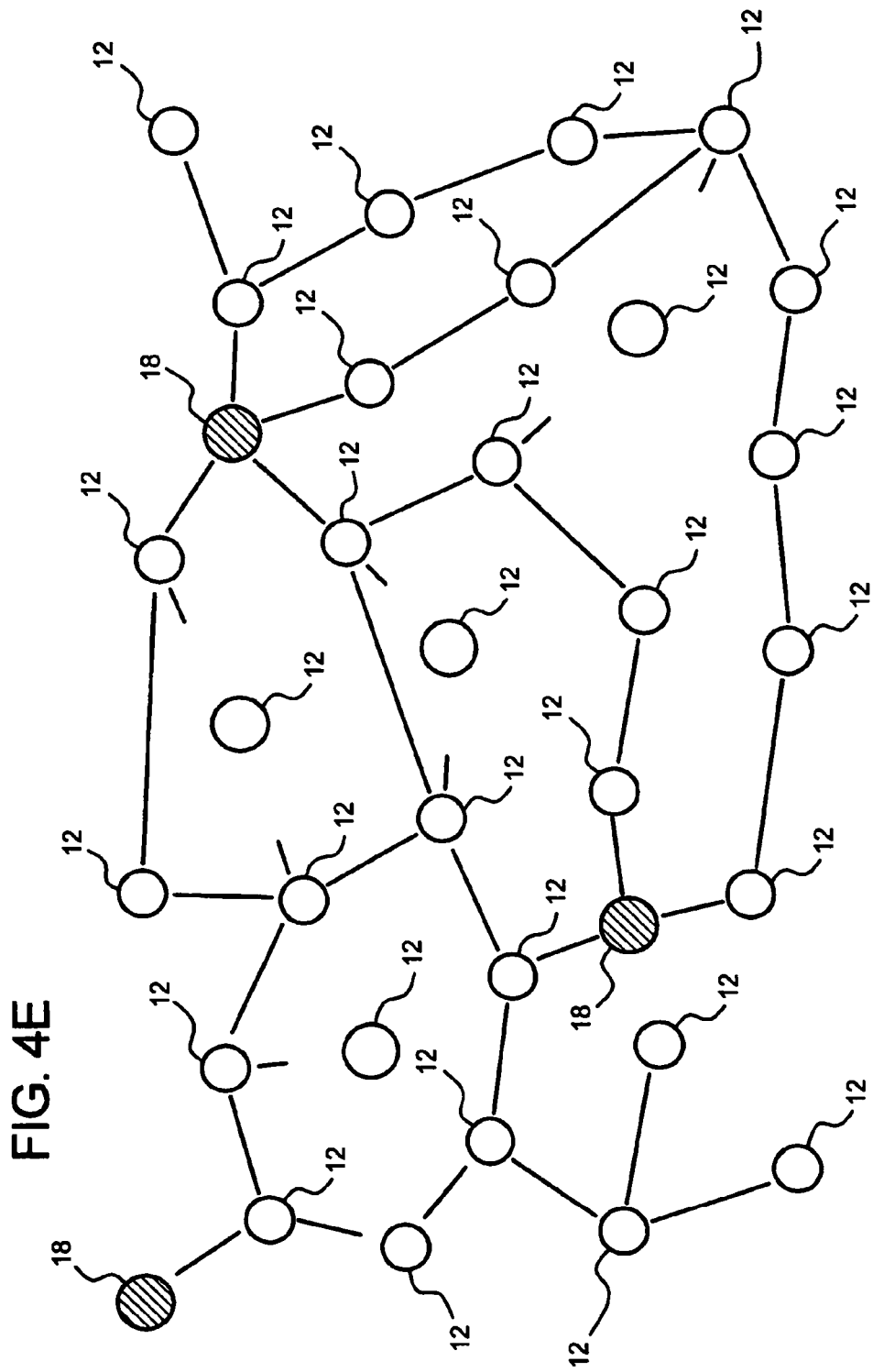
FIG. 4E is a schematic illustrating the network connectivity and transmission of information within the network shown in FIG. 4C after the failure of some of the nodes.

FIG. 4E demonstrates the robustness of the network of nodes 12 by illustrating the network connectivity and transmission of information within the network shown in FIG. 4C after the failure of multiple nodes 12. As shown in FIG. 4E, the failed nodes 12 disrupt the original communication paths formed as shown in FIG. 4B. However, due to the redundant communication paths, each of the aNodes 18 remain in contact with each other and are able to collect information from and through each of the functioning nodes 12. The routing algorithms programmed into the nodes 12 enable the nodes 12 to automatically rebuild the network connectivity upon deployment or failure of one or more nodes 12.

The distributed monitoring and control system 10 can be implemented to reduce the occurrence of combined sewer overflow (CSO) events. In order to reduce the occurrence of CSO events, the distributed monitoring and control system 10 performs two functions: monitoring and actuation. Similarly, the distributed monitoring and control system 10 can be implemented to maximize system performance, optimize collector pipes capacity, flush sewer pipes to reduce solids attached to pipe walls, divert flow to other locations and to reduce sewer overflow to other external systems, such as, for example, a treatment facility.

The monitoring function of the distributed monitoring and control system 10 is accomplished using the information acquired through the iNodes 14. For example, in the embodiment described with respect to FIGS. 1-3, the iNodes 14 may measure hydraulic parameters of a sewer system, such as, for example, flow of waste or water through a pipe, the level of water in a basin, etc. In one embodiment, redundant sensors may be used in conjunction with a consensus algorithm to accurate determine the status of the hydraulic parameters. Redundancy in the collection of information allows the distributed monitoring and control system 10 to be robust to failure of the iNodes 14. With redundancy, the measurements from each iNode 14 are less important than the aggregation of the information from the overlapping sensors. For example, even simple averages over the collected data can reduce the error induced by the use of coarse measurements, assuming measurement errors follow a particular distribution, such as a Gaussian distribution. Moreover, the accuracy of the individual measurements is not necessarily important for purposes of controlling the distributed monitoring and control system 10. The distributed monitoring and control system 10 can be configured to tune the accuracy of the measurements to the number of nodes 12 performing overlapping measurements to ensure sufficient accuracy. The data collected by the iNodes 14 is routed through the network of nodes, as shown in FIGS. 4A-4E, to the relevant aNodes 18 and gNodes 20.

The actuation function of the distributed monitoring and control system 10 is accomplished by the aNodes 18 or other nodes 12 including the functionality described above with respect to the aNodes 18. For example, the actuation function may be carried out by a node 12 that incorporates the functions of both the aNode 18 and the gNode 20 described above.

The control actions performed by the aNodes 18 are determined using a model-based distributed system control algorithm incorporating a model of the combined sewer system. Each aNode 18 receives the relevant information from the surrounding nodes 12 to make its own control command decision. The model-based distributed system control algorithm further enhances the robustness of the distributed monitoring and control system 10 and enables the distributed monitoring and control system 10 to operate with limited amount of communication between nodes 12. Limited communication is key to the aggressive power management schemes described above. Moreover, limited communication requires limited bandwidth to operate the wireless network of nodes 12, further improving the cost effectiveness and robustness of the distributed monitoring and control system 10.

Using a model-based distributed system control algorithm further allows the distributed monitoring and control system 10 to operate in a distributed fashion. In other words, the distributed monitoring and control system 10 does not require a central computing element to process the data from the entire system to determine and execute control commands. As a result, the distributed monitoring and control system 10 is capable of being employed to monitor and control massive amounts of information and geography.

Figure 5:
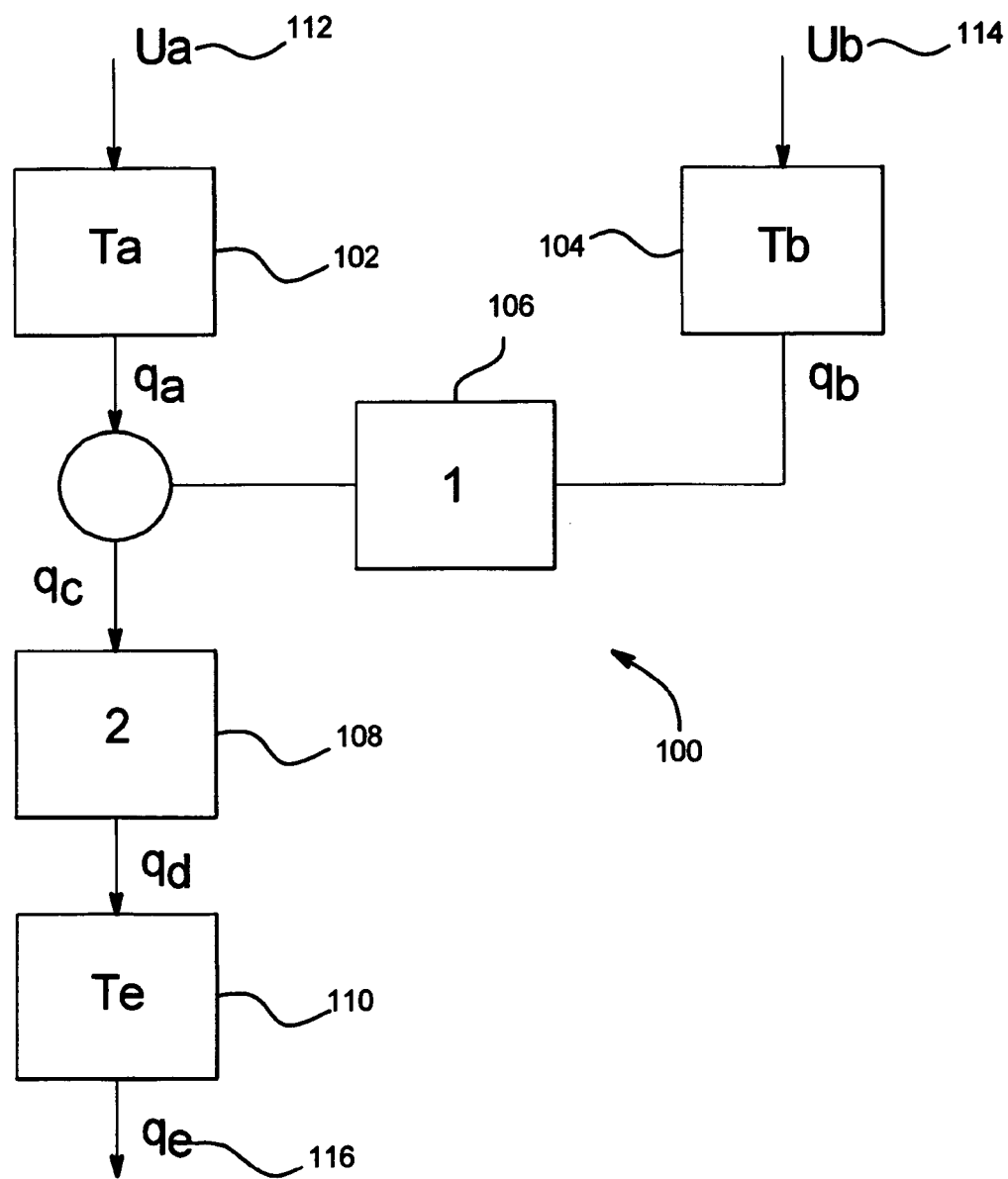
FIG. 5 is a schematic of a small sewer system and distributed monitoring and control system.

A small sewer network including a distributed monitoring and control system 100 is shown in FIG. 5. Reservoir Ta 102 and reservoir Tb 104 represent retention basins or other retention structures. A link element 106, for example a length of sewer pipe, is provided having a flow transport delay of one unit of time. Another link element 108 is provided having a flow transport delay of two units of time. Reservoir Te 110 receives the flow from reservoir Ta 102 and reservoir Tb 104. The input flow is represented in FIG. 5 by Ua 112 and Ub 114 and the output flow (for example, to a water treatment facility) is represented by Qe 116. The flows Qa 118, Qb 120 and Qe 122 are controlled flows using aNodes 18, as described above with respect to FIGS. 1-4E. Accordingly, the system dynamics can be described by the following equations:

$$h_a(k+1) = h_a(k) + (u_a(k) - q_a(k))T_a$$

$$h_b(k+1) = h_b(k) + (u_b(k) - q_b(k))T_b$$

$$q_c(k+1) = q_a(k+1) + q_b(k)$$

$$q_d(k+2) = q_c(k)$$

$$h_e(k+1) = h_e(k) + (q_d(k) - q_e(k))$$

This equation system can be further represented in the form of a traditional discrete linear time invariant state space equation with unknown disturbances Ua and Ub:

$$\begin{bmatrix} h_a \\ h_b \\ x_1 \\ q_d \\ x_2 \\ h_e \end{bmatrix}^+ = \begin{bmatrix} 1 & 0 & 0 & 0 & 0 & 0 \\ 0 & 1 & 0 & 0 & 0 & 0 \\ 0 & 0 & 0 & 0 & 0 & 0 \\ 0 & 0 & 0 & 0 & 1 & 0 \\ 0 & 0 & 1 & 0 & 0 & 0 \\ 1 & 0 & 0 & T_e & 0 & 0 \end{bmatrix} \begin{bmatrix} h_a \\ h_b \\ x_1 \\ q_d \\ x_2 \\ h_e \end{bmatrix} + \begin{bmatrix} -T_a & 0 & T_a & 0 \\ 0 & -T_b & 0 & T_b \\ 0 & 1 & 0 & 0 \\ 0 & 0 & 0 & 0 \\ 1 & 0 & 0 & 0 \\ 0 & 0 & 0 & 0 \\ 0 & 0 & 0 & -T_e \end{bmatrix} \begin{bmatrix} q_a \\ q_b \\ u_a \\ u_b \\ q_e \end{bmatrix}$$

The mathematical description of the sewer elements can be made more accurate by utilizing more detailed mathematical descriptions of the individual elements. The above simplified system is used here for clarity of the control approach used. The region over which the system is allowed to evolve is constraint as a result of limitations in the actual system such as maximum height in the reservoirs or maximum flow capacity in the pipes. With the information obtained by any sensors measuring Ua and Ub, control strategies can be calculated to maximize the use of the reservoirs during rain event, thus reducing flow directed to the water treatment facility. Networked model-based techniques, such as the ones described in Ref. Handbook of Networked and Embedded Control Systems, 2005, Birkhäusen, pp. 601-625, the entirety of which is incorporated herein by reference, can be used to determine the appropriate control strategy for the linearized system presented with reference to FIG. 5, or more detailed nonlinear systems.

An alternate decentralized approach for controlling CSO events is a "price-based" model-predictive control scheme. A price-based control can, for example, be implemented to stagger the operation of the actuators 23 connected to the aNodes 18 in a manner that maximizes the power of the water flowing through the sewer network. This is accomplished by having each of the aNodes 18 make local decisions about actuation on the basis of the head measured by the nodes 12 immediately upstream and downstream from each aNode 18. Because an individual aNode's 18 control decision is based only on the head of its immediate upstream/downstream nodes 12, this control strategy is highly decentralized For example, the price-based model predictive control algorithm may use a decentralized approach to solve the following flow optimization problem $$\underset{w.r.t.q(i)}{\text{maximize}} \int_0^\infty x^T(D^T q - x) dt$$

$$\text{subject to } \begin{aligned} q(t) &\le Q(Dx(t)) \\ \dot{x} &= q_0 + D^t q \end{aligned}$$

where x is a real vector whose components represent the head in the sewer network and q is a real vector whose components represent the flow rates in the sewer network. D is an incidence matrix for the directed graph formed by the sewer system, for example, the manholes and pipes. The optimization problem seeks to maximize the integrated flow power, $x^T D^T q$, discounted by the square of the head levels, $x^T x$. This maximization is done subject to a constraint that the flow rate, q, is bounded above by the function, $Q(D^T x)$, which relates flow rate, q, to the difference between the head levels in a pipe's upstream and downstream manhole. The second constraint is a differential equation that requires the rate of change in the head equal the total inflows into the manhole minus the total outflows from the manhole.

The flow optimization problem shown above is an optimal control problem whose solution via Pontryagin's maximum principle yields an optimal flow of the form $$q_j^* = \begin{cases} d_j x & \text{if } d_j(x-p) \le 0 \\ 0 & \text{otherwise} \end{cases}$$

where $d_j$ is the jth row of the incidence matrix D and where x and p are time-varying functions satisfying a two-point boundary value problem ("TPBVP"). The function x represents the head in the sewer system nodes 12. The function p (also called the co-state) is interpreted as a price that the network charges for storing water. The control law says that if the head difference exceeds a level set by the price, p, then the corresponding aNode 18 should increase flow, otherwise the flow should be decreased or stopped. This is a decentralized control since decisions are based on heads and prices of nodes 12 adjacent to the current node 12. The strategy controls the nodes' 12 outflows in a way that maximizes the difference between the head of two adjacent nodes 12. This leads to a staggered closing and opening of flow in a way that maximizes the flow power (product of the head difference and flow rate) while trying to control the head level at all nodes 12.

The TPBVP shown above in the price-based model predictive control algorithm is solved using a model-predictive control. Model-predictive (also called receding horizon) control generates a sequence of controls that are optimal over a finite horizon of length T. Using this stabilization technique it can be assured that this sequence asymptotically converges to the solution of an infinite-horizon optimization problem for any choice of horizon, T. Since the computational complexity associated with solving the TPBVP decreases with smaller T, the use of the stabilized receding horizon controller allows us to develop a computationally tractable control algorithm that is well suited to processing power of the nodes 12.

In another example, the system provided with reference to FIG. 5 can be divided into three coupled systems (one for each reservoir), each with its own set of inputs, outputs, and disturbances. For example, the control systems from reservoir Ta 102 and reservoir Tb 104 can independently calculate their control strategy based on information provided by the control system serving reservoir Te 110. This is accomplished by doing a feasibility analysis to determine bounds on the flow Qc, after which the control systems of Ta and Tb agree on values for Qa and Qb. The values for Qa and Qb may be based, for example, on parameters such as percentage of reservoir used. It is understood that the outlined control strategy is only one of the several that can be applied to solve the control problem.

Although the embodiment of the distributed monitoring and control system 10 described above specifically addresses the problems associated with combined sewer systems, the distributed monitoring and control system 10 provided herein may be adapted to address various environmental, security, engineering and other problems. For example, a distributed monitoring and control system may be used for tracking and monitoring people, vehicles and animals, for traffic control, as a forest fire early warning system, for fire or harmful gas detection, for inventory monitoring, for structural integrity monitoring or any other system in which distributed monitoring and control may be advantageous. In order to address these various systems, the sensors, actuators and algorithms described above may be adapted to the problems associated with the particular application.

It should be noted that various changes and modifications to the presently preferred embodiments described herein will be apparent to those skilled in the art. Such changes and modifications may be made without departing from the spirit and scope of the present invention and without diminishing its attendant advantages.

We claim:

1. A distributed monitoring and control system comprising:
 a plurality of nodes forming a communication network, wherein each node includes a processor, a memory and a transceiver, wherein said plurality of nodes includes a first node with a sensor for acquiring sensor information, a second node with an actuator, and a third node with an actuator;
 wherein said second node is adapted to receive sensor information from said first node and to receive actuator information from said third node;
 wherein said third node is adapted to receive sensor information from said first node and to receive actuator information from said second node; and,
 further wherein said processors for said second and said third nodes are each programmed with a distributed control algorithm to determine a control decision for said respective node's actuator based upon said sensor information from said first node and said actuator information from the other of said second or said third node.

2. The system of claim 1 wherein said third node is adapted to communicate said control decisions to said third node's actuator for execution.

3. The system of claim 2 wherein said control algorithm uses a distributed model-based networked control algorithm.

4. The system of claim 3 wherein said control algorithm is a distributed price-based control algorithm.

5. The system of claim 1 wherein said plurality of nodes communicate using a distributed broadcasting algorithm and a distributed routing algorithm.

6. The system of claim 5 wherein said routing algorithm is a gradient-based stateless distributed routing protocol.

7. The system of claim 1 wherein said sensor information is selected from the group consisting of hydraulic, chemical, biological and physical information in a sewer system.

8. The system of claim 1 wherein said third node's actuator is an actuator for altering a condition within a sewer system.

9. A system that monitors and controls a sewer system comprising:
a plurality of nodes forming a communication network, wherein each node includes a processor, a memory and a transceiver, wherein said plurality of nodes includes a plurality of sensor nodes each of which include a sensor for acquiring information selected from the group of hydraulic, chemical, biological and physical information and a plurality of actuator nodes each of which include an actuator for altering a condition within a sewer system, wherein at least one node is adapted to receive information from any other node in the system and to rebroadcast said information to another node which may also receive information from any other node in the system, further wherein each of said actuator nodes is programmed with a distributed control algorithm for determining a control decision for that node's actuator, based on sensor information from at least one of said sensor nodes and actuator information from at least one other actuator node.

10. The system of claim 9 wherein said control algorithm programmed in said actuator nodes is a distributed sewer system control algorithm to receive information acquired from said one or more sensors, calculate a control command and communicate said control command to said one or more actuators for execution.

11. The system of claim 9 wherein said plurality of nodes communicate using a distributed broadcasting algorithm and a distributed routing algorithm.

12. The system of claim 11 wherein said routing algorithm is a gradient-based stateless distributed routing protocol.

13. The system of claim 9 wherein said sensor is a hydraulic condition sensor.

14. The system of claim 9 wherein said actuator is a flow controlling device.

15. A method for monitoring and controlling sewer overflow events comprising the steps of:
providing a plurality of nodes forming a distributed communication network, wherein each node includes a processor, a memory, and a transceiver, wherein each of said nodes further includes a sensor for acquiring hydraulic, chemical, biological or physical information, further wherein each of said nodes includes an actuator for altering a condition within a sewer system, further wherein each of said processors is programmed with a distributed combined sewer system control algorithm to receive information acquired from said one or more nodes, calculate a control command and communicate said control command to said one or more actuators for execution; and
altering at least one condition within a sewer system by one of said actuators based on a decision determined at that actuator's node.

16. The system of claim 15 wherein said distributed sewer system control algorithm uses a distributed model-based networked control algorithm.

17. The system of claim 15 wherein said distributed sewer system control algorithm is a distributed price-based control algorithm.

18. The system of claim 15 wherein said distributed sewer system control algorithm is adapted to globally reduce sewer flows to an external system by maximizing overall conveyance and storage.

19. The system of claim 15 wherein said distributed sewer system control algorithm is adapted to maximize system performance.

\* \* \* \* \*